Dec. 22, 1925.　　　　　Z. CIFFRINOWITSCH　　　　　1,566,902
INDUCTION METER
Filed Oct. 16, 1922
Fig.1.　　　　　Fig.2.
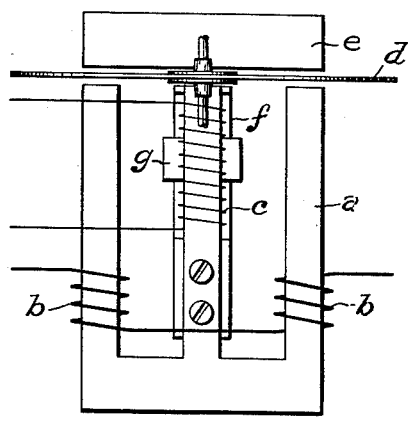
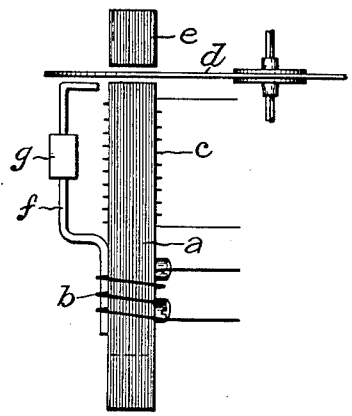
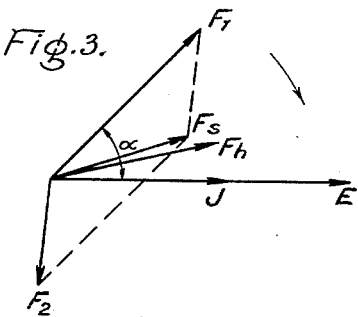
Fig.3.
Inventor:
Zalmann Ciffrinowitsch,
by Albert G. Davis
His Attorney.

Patented Dec. 22, 1925.

1,566,902

UNITED STATES PATENT OFFICE.

ZALMANN CIFFRINOWITSCH, OF BERLIN, GERMANY, ASSIGNOR TO GENERAL ELECTRIC COMPANY, A CORPORATION OF NEW YORK

INDUCTION METER.

Application filed October 16, 1922. Serial No. 594,752.

*To all whom it may concern:*

Be it known that I, ZALMANN CIFFRINOWITSCH, a citizen of Russia, residing at Berlin, Germany, have invented certain new and useful Improvements in Induction Meters, of which the following is a specification.

My invention relates to induction meters and more in particular to means for obtaining the desired phase angular relation between the current and voltage fluxes.

It is well known that in an induction type watt meter the fluxes produced by the voltage and current coils are made to differ 90 deg. in time phase from each other at unity power factor, whereas, in the reactive component meter, the two fluxes are arranged to be in phase at unity power factor in which condition no rotative torque is produced. As the power factor varies from unity the two fluxes differ in time phase to produce a torque equal to $EJ \sin \phi$, where $\phi$ is the phase angle between current and voltage.

The primary object of my invention is to provide a meter of the latter class in which the correct angular relation between the current and voltage fluxes is easily and efficiently obtained and which permits this angular relation to be readily adjusted after the meter parts are assembled. In carrying my invention into effect, I provide one or more adjustable magnetic shunts for causing an artificial dispersion of the magnetic flux created by the current and voltage coils. The features of my invention which I believe to be novel and patentable will be pointed out in the claims appended hereto. The preferred construction and the theory of operation of a reactive component meter built in accordance with my invention will now be explained in connection with the accompanying drawings in which Fig. 1 represents a side view of the essential parts of a single phase meter to which my invention is applied; Fig. 2 shows a view taken at right angles to Fig. 1 and Fig. 3 is a vector diagram descriptive of the flux relations of my improved meter.

Referring to the drawings, the magnet body $a$ of my improved meter is preferably constructed with three legs. The current coils $b$ are situated on the outer legs of the magnet body $a$ and are located to advantage near the yoke of the magnet body, that is, as far as possible from the air gap and the actuating disc $d$. The voltage coil is disposed on the middle core of the magnet body $a$ preferably near the air gap or actuating disc. On the leg carrying the voltage winding is fixed a magnetic shunt $f$ which is made of solid or slightly laminated iron and which, if desired, carries a short circuiting ring $g$. By this means the magnetic field created by the voltage coil $c$ is divided into two effective parts. One part runs in the usual manner from the middle leg through the actuating disc $d$, through the cooperating magnetic member $e$ and then through the outer legs of the magnet body $a$. The second part of the field runs through the actuating disc $d$ and the magnetic shunt $f$.

In Fig. 3 it may be assumed that the current to be metered has no reactive component, that is, the voltage E and the current J are in phase as represented by the vectors E and J. The voltage E creates in the voltage coil a magnetic flux which is divided into two parts, $F_1$ and $F_2$. The magnetic field $F_1$, which starts from the middle leg of the magnet body, lags by a certain angle in consequence of the self induction of the voltage coil. The magnetic field which flows through the shunt $f$ has a direction $F_2$ in consequence of the magnetic leakage of the shunt and of the short circuiting ring $g$ thereon. The two fields $F_1$ and $F_2$ form the resultant or effective field $F_s$. In consequence of the leakage of the outer legs of the magnet which project some distance beyond the current coil, the magnetic field created by the current in the current coil $b$ lags in phase and assumes a direction represented by the vector $F_h$. The leakage of the outer legs of the magnet body may be supplemented by placing short circuiting rings thereon, which if desired, may be adjustable.

By the correct proportion of the various flux shifting means above mentioned, and especially by the proportioning of the shunt $f$, the short circuiting ring $g$, the length of the outer legs of the driving core and the leakage between the current coils and the voltage coil, the fields $F_s$ and $F_h$ can be made to have practically the same vector direction such as illustrated at unity power factor and any phase angle still existing between these two vectors may be eliminated by shifting the short circuiting ring $g$ located on the shunt $f$ or the short circuiting rings located on the outer legs of the core.

While I have described my invention as applied to a reactive component meter, I do not wish to be limited thereto because it will be evident to those skilled in the art that the means described may be utilized within certain limits to obtain other desired phase angular relations between the current and voltage fluxes in an induction type meter.

What I claim as new and desire to secure by Letters Patent of the United States, is:—

1. An induction disc meter of the three legged type having a potential coil on the middle leg and current coils on the outer legs, characterized by the fact that the potential coil is positioned closely adjacent the meter disc and is provided with means for shunting a portion of its effective flux, and by the fact that the current coils are positioned a sufficient distance from the meter disc as to allow a considerable leakage of the flux produced thereby.

2. A reactive component induction disc meter of the three legged type having a potential coil on the middle leg and current coils on the outer legs, characterized by the fact that said coils are considerably shorter than said legs, the potential coil being closely adjacent the meter disc and the current coils a considerable distance therefrom and by the fact that said middle leg is provided with an adjustable auxiliary magnetic shunt.

3. An induction disc meter of the three legged type having a potential coil on the middle leg and current coils on the outer legs, said legs being considerably longer than said coils and said potential coil being arranged nearer the meter disc than said current coils, a magnetic shunt for said middle leg, said parts being so proportioned and arranged that the effective current and voltage fluxes are in phase at unity power factor.

In witness whereof, I have hereunto set my hand this 25th day of September, 1922.

ZALMANN CIFFRINOWITSCH.